US008084547B2

(12) United States Patent
Obrecht

(10) Patent No.: US 8,084,547 B2
(45) Date of Patent: Dec. 27, 2011

(54) METHODS FOR PRODUCING RUBBER MIXTURES

(75) Inventor: Werner Obrecht, Moers (DE)

(73) Assignee: LANXESS Deutschland GmbH, Leverkusen, DE (US)

( * ) Notice: Subject to any disclaimer, the term of this patent is extended or adjusted under 35 U.S.C. 154(b) by 0 days.

(21) Appl. No.: 12/597,364

(22) PCT Filed: Apr. 17, 2008

(86) PCT No.: PCT/EP2008/054663
§ 371 (c)(1),
(2), (4) Date: Mar. 2, 2010

(87) PCT Pub. No.: WO2008/132061
PCT Pub. Date: Nov. 6, 2008

(65) Prior Publication Data
US 2010/0197829 A1   Aug. 5, 2010

(30) Foreign Application Priority Data
Apr. 27, 2007   (DE) .......................... 10 2007 020 451

(51) Int. Cl.
C08F 8/00   (2006.01)
(52) U.S. Cl. ............ 525/332.6; 525/191; 525/192; 525/232; 525/350; 524/525; 524/526
(58) Field of Classification Search ............ 525/191, 525/192, 232, 332.6, 350; 524/525, 526
See application file for complete search history.

(56) References Cited

U.S. PATENT DOCUMENTS

| | | |
|---|---|---|
| 3,773,732 A | 11/1973 | Dillenschueider |
| 3,938,574 A | 2/1976 | Burmester et al. |
| 4,202,954 A | 5/1980 | Massoubre |
| 4,709,065 A | 11/1987 | Yoshioka et al. |
| 4,820,751 A | 4/1989 | Takeshita et al. |
| 5,124,408 A | 6/1992 | Engels et al. |
| 5,227,425 A | 7/1993 | Rauline |
| 5,302,696 A | 4/1994 | Schiessl |
| 5,395,891 A | 3/1995 | Obrecht et al. |
| 5,442,009 A | 8/1995 | Parker et al. |
| 6,127,488 A | 10/2000 | Obrecht et al. |
| 6,133,364 A | 10/2000 | Obrecht et al. |
| 6,184,296 B1 | 2/2001 | Obrecht et al. |
| 6,207,757 B1 | 3/2001 | Obrecht et al. |
| 6,242,534 B1 | 6/2001 | Obrecht et al. |
| 6,372,857 B1 | 4/2002 | Obrecht et al. |
| 6,399,706 B1 * | 6/2002 | Obrecht et al. ............ 525/191 |
| 6,573,346 B1 | 6/2003 | Melchiors et al. |
| 6,579,945 B2 | 6/2003 | Obrecht et al. |
| 6,620,886 B2 | 9/2003 | Obrecht et al. |
| 6,632,888 B2 | 10/2003 | Obrecht et al. |
| 6,649,696 B2 | 11/2003 | Obrecht et al. |
| 6,737,478 B2 | 5/2004 | Obrecht et al. |
| 2001/0051685 A1 | 12/2001 | Obrecht et al. |
| 2003/0092827 A1 | 5/2003 | Obrecht et al. |
| 2005/0182158 A1 | 8/2005 | Ziser et al. |

FOREIGN PATENT DOCUMENTS

| | | |
|---|---|---|
| EP | 0099074 A2 | 1/1984 |
| EP | 0447066 B1 | 5/1996 |
| EP | 1149866 A2 | 10/2001 |
| EP | 1149867 A2 | 10/2001 |
| EP | 1152030 A2 | 11/2001 |
| EP | 1520732 A1 | 4/2005 |
| EP | 1291369 B1 | 3/2006 |
| EP | 1298166 B1 | 2/2007 |
| EP | 1245630 B1 | 3/2008 |
| GB | 1078400 | 8/1964 |
| JP | 56104906 | 8/1981 |

OTHER PUBLICATIONS

International Search Report from co-pending Application PCT/EP2008/054663 dated Apr. 17, 2008, 4 pages.
Hsieh, Quirk; "Styrene-Diene Rubbers", Anionic Polymerization—Principles and Practical Applications, Marcel Dekker Inc. NY, Basle, 1996, Chapter 17, pp. 447-469.
I. Franta; Elastomers and Compounding Materials; Elsevier, 1989, pp. 88-112 Studies in Polymer Science 1.
Bartl and Falbe; Houben-Weyl, Methoden der Organischen Chemis (Methods of Organic Chemistry], Thieme, Verlag, Stuttgard, 1987, vol. E30, pp. 214-234.
Ullmann's Encyclopedia of Industrial Chemistry, Rubber, 3. vol. A23, VCH Verlagsgesellschaft mbH, D-69451, Weinheim, 1993, pp. 239-364.
K.H. Nordsiek, Mari (Fed. Rep. of Germany); GAK Kautschuk Gummi Kunstoffe 38, Jahrgang, Nr. 3/8, pp. 178-185 "The Integral Rubber Concept—An Approach to an Ideal Tire Tread Rubber", (1985).
Ullmann's Encyclopedia of Industrial Chemistry, vol. A23, VCH Verlagsgesellschaft mbH, D-69451, Weinheim, 1993, pp. 635-645, Silica.
Houben-Weyl, Methoden der organischrn Chemie [Methods of organic chemistry], 4th edition, vol. 14/2, pp. 848-850, (1991).
Ullmann's Encyclopedia of Industrial Chemistry, VCH Verlagsgesellschaft mbH, D-69451, Weinheim, 1993, vol. A23, pp. 365-420 Rubber, 4. Chemicals and Additives.
Ullmanns Encyclopedia of Industrial Chemistry, vol. A5, Carbon, pp. 95-163, (1993).

\* cited by examiner

*Primary Examiner* — Ling-Choi Choi
(74) *Attorney, Agent, or Firm* — Nicanor A. Kohncke

(57) ABSTRACT

The invention relates to processes for the production of microgel-containing rubber mixtures, to rubber mixtures obtainable by the processes, to processes for the production of vulcanizates, and also to vulcanizates after the vulcanization process, in particular in the form of tires, parts of tires, or industrial rubber items.

17 Claims, No Drawings

METHODS FOR PRODUCING RUBBER MIXTURES

CROSS REFERENCE TO RELATED PATENT APPLICATIONS

The present patent application claims the right of priority under 35 U.S.C. §119 (a)-(d) and 35 U.S.C. §365 of International Application No. PCT/EP2008/054663, filed 2008-04-17, which is entitled to the right of priority of German Patent Application No. 10 2007 020 451.7, filed 2007-04-27.

The invention relates to processes for the production of microgel-containing rubber mixtures, to rubber mixtures obtainable by these processes, to processes for the production of vulcanizates, and also to vulcanizates after the vulcanization process, in particular in the form of tires, parts of tires, or industrial rubber items. The processes of the invention improve the physical and mechanical properties of unvulcanized and vulcanized rubber mixtures comprising silica and microgels, in particular microgels based on rubbers, by carrying out the reaction with sulfur-containing organosilicon compounds sequentially, i.e. in a plurality of separate stages.

It is known that silica-containing rubber mixtures can be used for the production of tire treads with a good combination of rolling resistance properties, wet slip resistance properties, and abrasion properties, these being the properties demanded for car tire treads. If the desired combination of properties is to be achieved, it is important to obtain good dispersion of the silica and to couple it effectively to the rubber matrix during the vulcanization process. Sulfur-containing organic silanes are used for this purpose during production of the mixture (e.g.: DE-A-24 47 614; U.S. Pat. No. 4,709,065; EP-A-0 501 227; EP-A-99 074; DE-A-3 813 678 and also EP-A-447 066).

These patents use silica in combination with sulfur-containing organic silanes during production of the mixture. The silanes are added to the mixture with the silica in the same mixing step in order to hydrophobize the silica and to achieve good dispersion within the mixture. Use of the sulfur-containing organosilanes during the vulcanization process also achieves good coupling of the silica to the rubber matrix.

These patents do not contain any teaching about the combination of silica with microgels or about sequential silane addition.

The use of microgels in compounded rubber materials is also known and is described by way of example in the following patents or applications: EP-A-405 216, EP-A-0 575 851, DE-A-197 01 489, EP-A-1 149 866, EP-A-1 149 867, EP-A-1 152 030, EP-A-1 298 166, EP-A-1 245 630, and EP-A-1 291 369.

EP-A-405 216 teaches the production and use of gels based on polychloroprene. EP-A-0 575 851 teaches the production and use of gels based on polybutadiene, and EP-A-0 854 171 teaches the production of gels using groups which are active in vulcanization processes. According to the teaching of these patents, the use of gels is advantageous for achieving a good wet slip resistance/rolling resistance relationship. An index for this combination of properties is the difference in rebound resilience values at 70° C. and 23° C. ($\Delta(R_{70}-R_{23})$). However, the mechanical properties of the vulcanizates produced using these gels are not satisfactory.

The use of silanes (EP-A-1 063 259/U.S. Pat. No. 6,399,706) improves the mechanical properties of microgel-containing compounded rubber materials. The compounded materials are based on NR and comprise only gel, without any further fillers. The compounded materials are produced in a two-stage process. According to the teaching of this patent, additions of 75 phr of gel (without silica) give very high differences in the rebound resilience values between 70° C. and 23° C. (maximum values of 43% and 45% in $3^{rd}$ mixture series). However, the mechanical properties of the vulcanizates, and in particular the product ($\sigma_{300} \times \epsilon_b$) of modulus for 300% elongation ($\sigma_{300}$) and elongation at break ($\epsilon_b$), are inadequate.

Further improvements, in particular in the mechanical properties of the vulcanizates, expressed as product $\sigma_{300} \times \epsilon_b$, are successfully achieved via the combination of silica, microgel, and carbon black in rubber-compounded materials (EP-A-1 401 951/US-A-2003/092827). The best values are found for addition of 1 phr of the microgel ($\sigma_{300} \times \epsilon_b = 5106$). The product $\sigma_{300} \times \epsilon_b$ becomes less satisfactory if the content of microgel is further increased. In the presence of silica, the highest values for the differences in rebound resilience values $\Delta(R_{70}-R_{23})$ are 30% (mixture series A) and 36% (mixture series B). The greatest difference in the rebound resilience values $\Delta(R_{70}-R_{23})$ is 38%, observed for the silica-free compounded material No. 8 in mixing series B.

According to the teachings of EP-A-1 149 866, EP-A-1 149 867, EP-A-1 152 030, EP-A-1 298 166, EP-A-1 245 630, EP-A-1 291 369, compounded rubber materials are produced which comprise silica in combination with gel. These patents give no teaching relating to the sequential addition of silane. Nor do the patents mentioned give any information relating to the 300 modulus ($\sigma_{300}$). It is therefore impossible to use the product ($\sigma_{300} \times \epsilon_b$) to make any comparison between the mechanical properties of the vulcanizates produced by the teaching of these patents with other data accessible in the patent literature, etc.

Further improvement in the properties of compounded rubber materials which comprise silica and rubber gels requires further improvement in the vulcanizate properties, in particular in the product of modulus at 300% elongation and elongation at break ($\sigma_{300} \times \epsilon_b$), without any impairment of the differences in rebound resilience values $\Delta(R_{70}-R_{23})$.

It has now been found that this aim can be achieved using compounded rubber materials in particular based on SBR and BR, where these comprise, as fillers, at least one oxidic filler containing hydroxy groups, a particular example being silica, and rubber gel, when the mixture is produced in a plurality of stages, where the addition of the sulfur-containing organic silane is divided over at least two mixing stages.

The invention therefore provides a process for the production of rubber mixtures which encompasses the mixing of the following components:
a) one or more rubber components,
b) one or more oxidic fillers containing hydroxy groups,
c) one or more microgels containing hydroxy groups,
d) one or more sulfur-containing organosilicon compounds,
e) if appropriate, one or more vulcanizing agents,
f) if appropriate, one or more rubber additives,
characterized in that the sulfur-containing organosilicon compound is added in at least two separate portions, where the first portion encompasses at least 30% by weight of the total amount of the sulfur-containing organosilicon compound.

Rubber Component a)

The rubber components a) of the invention preferably include those based on dienes, particular examples being rubbers which contain double bonds and which comprise practically no gel content, and which DIN/ISO 1629 terms R-rubbers. These rubbers have double bonds in the main chain. Examples of rubber components preferably used are those based on

| | |
|---|---|
| NR: | natural rubber |
| SBR: | styrene/butadiene rubber |
| BR: | polybutadiene rubber |
| IR: | polyisoprene |
| SIBR: | styrene/isoprene rubber |
| NBR: | nitrile rubber |
| IIR: | butyl rubber (isobutene/isoprene rubber) |
| HNBR: | hydrogenated nitrile rubber |
| SNBR: | styrene/butadiene/acrylonitrile rubber |
| CR: | polychloroprene |
| XSBR: | carboxylated styrene/butadiene rubber |
| XNBR: | carboxylated butadiene/acrylonitrile rubber |
| ENR: | epoxydized natural rubber |
| ESBR: | epoxydized styrene/butadiene rubber and mixtures of these. |

In the invention, rubber components containing double bonds also include those which DIN/ISO 1629 terms M-rubbers, having double bonds in side chains alongside the saturated main chain. Among these is, for example, EPDM.

Rubber components preferred in the invention are: NR, BR, IR, SBR, IIR, and EPDM.

Particular preference is given to natural rubber (NR) and to synthetic polyisoprene (IR), and also to styrene/diolefin rubbers, in particular styrene/diene rubbers, in particular styrene/butadiene rubbers, and also to mixtures of these rubbers.

Styrene/diolefin rubbers (in particular butadiene rubbers) mean not only solution SBR rubbers, abbreviated to SSBR, but also emulsion SBR rubbers, abbreviated to: ESBR. SSBR means rubbery polymers which are produced in a solution process, based on vinylaromatics and on conjugated dienes (H. L. Hsieh, R. P. Quirk, Marcel Dekker Inc. New York, Basle 1996; I. Franta Elastomers and Rubber Compounding Materials; Elsevier 1989. pages 73-74, 92-94; Houben-Weyl, Methoden der Organischen Chemie [Methods of organic chemistry], Thieme Verlag, Stuttgart, 1987, volume E 20, pages 114 to 134; Ullmann's Encyclopedia of Industrial Chemistry, Vol A 23, Rubber 3. Synthetic, VCH Verlagsgesellschaft mbH, D-69451 Weinheim, 1993, S. 239-364, and also (FR 2 295 972)). Suitable vinylaromatic monomers are styrene, o-, m-, and p-methylstyrene, industrial methylstyrene mixtures, p-tert-butylstyrene, α-methylstyrene, p-methoxystyrene, vinylnaphthalene, divinylbenzene, trivinylbenzene, and divinylnaphthalene. Styrene is preferred. The content of copolymerized vinylaromatic is preferably from 5 to 50% by weight, more preferably from 10 to 40% by weight. Suitable diolefins are 1,3-butadiene, isoprene, 1,3-pentadiene, 2,3-dimethylbutadiene, 1-phenyl-1,3-butadiene, and 1,3-hexadiene. Preference is given to 1,3-butadiene and isoprene. The content of copolymerized dienes is from 50 to 95% by weight, preferably from 60 to 90% by weight. The content of vinyl groups in the copolymerized diene is from 10 to 90%, and the content of 1,4-trans double bonds is from 20 to 80%, and the content of 1,4-cis double bonds is complementary to the entirety of vinyl groups and 1,4-trans double bonds. The vinyl content of the SSBR is preferably >20%.

The polymerized monomers and the various diene configurations usually have random distribution in the polymer. The definition of SSBR (A) is also intended to include rubbers having block-type structure, these being termed integral rubber (K.-H. Nordsiek, K.-H. Kiepert, GAK Kautschuk Gummi Kunststoffe 33 (1980), no. 4, 251-255).

SSBR is intended to mean not only linear rubbers but also branched or end-group-modified rubbers. By way of example, FR 2 053 786 and JP-A-56-104 906 are mentioned here. The branching agent used preferably comprises silicon tetrachloride or tin tetrachloride.

Rubber component a) for the rubber mixtures of the invention is in particular produced by anionic solution polymerization, i.e. by means of catalyst based on alkali metal or on alkaline earth metal, in an organic solvent.

The vinylaromatic/diolefin rubbers polymerized in solution advantageously have Mooney values of from 20 to 150 Mooney units, preferably from 30 to 100 Mooney units. In particular, the high-molecular-weight ESBR grades with Mooney values>80 MU can comprise amounts of from 30 to 100 parts by weight of oils, based on 100 parts by weight of rubber. The oil-free SSBR rubbers have glass transition temperatures of from −80° C. to +20° C., determined by differential thermal analysis (DSC).

ESBR means rubbery polymers which are produced in an emulsion process based on vinylaromatics, on conjugated dienes and, if appropriate, on further monomers (Ullmann's Encyclopedia of Industrial Chemistry, Vol A 23, Rubber 3. Synthetic, VCH Verlagsgesellschaft mbH, D-69451 Weinheim, 1993, pp. 247-251). Vinylaromatics are styrene, p-methylstyrene, and alpha-methylstyrene. Dienes are in particular butadiene and isoprene. Further monomers are in particular acrylonitrile. The contents of vinylaromatics are from 10 to 60% by weight. The glass transition temperature is from −50 to +20° C. (determined by means of DSC), and the Mooney values are from 20 to 150 Mooney units. In particular, the high-molecular-weight ESBR grades with Mooney values>80 MU can comprise amounts of from 30 to 100 parts by weight of oils, based on 100 parts by weight of rubber. The oil-free SSBR rubbers have glass transition temperatures of from −80° to +20° C., determined by differential thermal analysis (DSC).

Polybutadiene (BR) encompasses in particular two different classes of polybutadiene. The first class has 1,4-cis content of at least 90%, and is produced with the aid of Ziegler/Natta catalysts, based on transition metals. It is preferable to use catalyst systems based on Ti, Ni, Co, and Nd (Houben-Weyl, Methoden der Organischen Chemie [Methods of organic chemistry], Thieme Verlag, Stuttgart, 1987, volume E 20, pages 114 to 134; Ullmann's Encyclopedia of Industrial Chemistry, Vol A 23, Rubber 3. Synthetic, VCH Verlagsgesellschaft mbH, D-69451 Weinheim, 1993, pp. 239-364). The glass transition temperature of this polybutadiene is preferably <−90° C. (determined by means of DSC).

The second class of polybutadiene is produced using Li catalysts, and has vinyl contents of from 10% to 80%. The glass transition temperatures of these polybutadiene rubbers are in the range from −90 to +20° C. (deterwined by means of DSC).

Polyisoprene (IR) has at least 70% 1,4-cis content. The materials used are not only synthetic 1,4-cis polyisoprene (IR) but also natural rubber (NR). IR is synthesized either by means of lithium catalysts or else with the aid of Ziegler/Natta catalysts (Houben-Weyl, Methoden der Organischen Chemie [Methods of organic chemistry], Thieme Verlag, Stuttgart, 1987, volume E 20, pages 114 to 134; Ullmann's Encyclopedia of Industrial Chemistry, Vol. A 23, Rubber 3. Synthetic, VCH Verlagsgesellschaft mbH, D-69451 Weinheim, 1993, pp. 239-364). It is preferable to use natural rubber.

IR also includes polyisoprene, known as 3,4-polyisoprene, having glass transition temperatures in the range from −20 to +30° C.

In the invention, the rubber component is preferably selected from the group consisting of: styrene/butadiene rubbers, polybutadiene, and polyisoprene, and these rubbers can also have been extended using mineral oils.

The ratio of the other components to the rubber components a) is usually stated by using the relative unit phr (parts per hundred parts rubber (i.e. component a)). The usual amounts used per 100 parts by weight of rubber components a) are from 5 to 100 parts by weight of the oxidic filler b) containing hydroxy groups (corresponding to from 5 to 100 phr), from 1 to 30 phr, preferably from 5 to 25 phr, of the microgels c), from 0.1 phr to 15 phr, preferably from 0.2 phr to 10 phr, of the sulfur-containing organosilicon compound d), preferably bis(triethoxysilylpropyl) tetrasulfide or bis(triethoxysilylpropyl) disulfide, from 0.1 to 15 phr, preferably from 0.1-10 phr, of the vulcanizing agents e), and also from 0.1 to 200 phr of the rubber additives f). The mixtures of the invention preferably also comprise amounts of from 1 to 100 phr of carbon black.

Oxidic Filler b) Containing Hydroxy Groups

The oxidic filler b) used, containing hydroxy groups, preferably comprises a silicone-containing oxidic filler containing hydroxy groups, in particular silica. These are in particular hydrophilic silicas which in particular bear hydroxy groups at the surface.

Silica (Ullmann's Encyclopedia of Industrial Chemistry, VCH Verlagsgesellschaft mbH, D-69451 Weinheim, 1993, "Silica", pp. 635-645) is in particular used in the form of fumed silica (ibid., pp. 635-642) or in the form of precipitated silica (ibid. 642-645), but the invention gives preference to the precipitated silica here. The specific surface area of the precipitated silicas is from 5 to 1000 $m^2/g$, determined by the BET method, preferably from 20 to 400 $m^2/g$. They are obtained by treating waterglass with inorganic acids, preference being given to use of sulfuric acid. The silicas can also, if appropriate, take the form of mixed oxides with other metal oxides, examples being those of Al, Mg, Ca, Ba, Zn, Zr or Ti.

The invention preferably uses silicas having specific surface areas of from 5 to 1000 $m^2/g$, and more preferably from 20 to 400 $m^2/g$, in each case determined by the BET method. The preferred amounts used of the oxidic filler b) containing hydroxy groups in the invention are from 20 to 150 phr, preferably from 30 to 120 phr, based on 100 phr (parts per 100 parts rubber), and the oxidic filler b) containing hydroxy groups here makes up at least 30%, preferably at least 50%, of the filler content, based on the total amount of fillers used.

Microgels c)

The microgels that can be used in the vulcanizable composition of the invention have glass transition temperatures in the range from −75° C. to +120° C. (determined by means of DSC).

The microgel used in the vulcanizable composition of the invention is usually a crosslinked microgel based on homopolymers or on copolymers. The microgels used in the invention are therefore usually crosslinked homopolymers or crosslinked copolymers. The terms homopolymers and copolymers are well known to the person skilled in the art and are explained by way of example in Vollmert, Polymer Chemistry, Springer 1973.

The glass transition temperatures of the microgels are generally higher by from 1° C. to 10° C. than the glass transition temperatures of the corresponding uncrosslinked homo- or copolymers, and, in a first approximation, the glass transition temperatures of the microgels here rise in proportion to the degree of crosslinking. The glass transition temperatures of weakly crosslinked microgels are only about 1° C. higher than those of the corresponding homo- or copolymers. The glass transition temperatures of highly crosslinked microgels can be up to 10° C. higher than the glass transition temperatures of the corresponding uncrosslinked homo- or copolymers. The following equations can in particular be used to calculate the glass transition temperatures of the underlying uncrosslinked copolymers (see, for example: U. Eisele, Einführung in die Polymerphysik [Introduction to polymer physics], Springer-Verlag):

$$Tg_{Copolymer} = w_1 * Tg_1 + w_2 * Tg_2 + w_3 * Tg_3 + \ldots$$

$Tg_{copolymer}$: glass transition temperature of copolymer in ° C.
$W_1$: proportion by weight of homopolymer 1
$Tg_1$: glass transition temperature of homopolymer 1 in ° C.
$W_2$: proportion by weight of homopolymer 2
$Tg_2$: glass transition temperature of homopolymer 2 in ° C.
$W_3$: proportion by weight of homopolymer 3
$Tg_3$: glass transition temperature of homopolymer 3 in ° C.

$$\frac{1}{Tg_{Copolymer}} = \frac{w_1}{Tg_1} + \frac{w_2}{Tg_2} + \frac{w_3}{Tg_3} + \ldots$$

$Tg_{copolymer}$: glass transition temperature of copolymer in K
$W_1$: proportion by weight of homopolymer 1
$Tg_1$: glass transition temperature of homopolymer 1 in K
$W_2$: proportion by weight of homopolymer 2
$Tg_2$: glass transition temperature of homopolymer 2 in K
$W_3$: proportion by weight of homopolymer 3
$Tg_3$: glass transition temperature of homopolymer 3 in K Good results are achieved in these calculations if the following glass transition temperatures of the corresponding homopolymers are used as starting point: polybutadiene: −80° C., polyisoprene: −65° C., polychloroprene: −39° C., polystyrene: +100° C., polyacrylonitrile: +100° C., poly-alpha-methylstyrene: +115° C., poly(2-hydroxyethyl methacrylate): +75° C. and poly(2-hydroxypropyl methacrylate): +80° C. Further glass transition temperatures have been published in J. Brandrup, E. H. Immergut, Polymer Handbook, Wiley & Sons 1975.

The microgels used in the vulcanizable composition of the invention advantageously have the following insoluble fraction in toluene at 23° C. ("gel content"): at least 70% by weight, preferably at least 80% by weight, and particularly preferably at least 90% by weight. This fraction insoluble in toluene is determined in toluene at a temperature of 23°. 250 mg of the microgel here are swollen in 25 ml of toluene for 24 hours, with shaking at 23° C. The insoluble fraction is isolated and dried after centrifuging at 20 000 rpm. Gel content is calculated from the quotient calculated from the dry residue and from the starting weight, and is stated in percent by weight.

The microgels used in the vulcanizable composition of the invention usually have a swelling index ("SI") of less than 80, preferably less than 60, and in particular less than 40, in toluene at 23° C. The swelling index of the microgels is particularly preferably in the range from 1 to 30, in particular in the range from 1 to 20. The swelling index SI is calculated by the following formula from the weight of the solvent-containing microgel swollen in toluene for 24 hours at 23° C. (after centrifuging at 20 000 rpm) and the weight of the dry microgel:

SI=wet weight of microgel/dry weight of microgel.

To determine the swelling index, 250 mg of the microgel is permitted to swell for 24 h in 25 ml of toluene, with shaking. The gel is isolated by centrifuging and is weighed, and is then dried to constant at 70° C., and again weighed.

The glass transition temperatures $T_g$ of the microgels used in the vulcanizable composition of the invention are preferably in the range from −90° C. to +150° C., particularly preferably in the range from −80° C. to +120° C.

The range of the glass transition ("$\Delta T_g$") of the microgels used is moreover greater than 5° C., preferably greater than 10° C., particularly preferably greater than 20° C. Microgels having this type of glass transition range do not generally have completely homogeneous crosslinking, in contrast to the completely homogeneous microgels obtained, for example, by radiation crosslinking. The result of this is that there is not an immediate change in modulus from the matrix phase to the disperse phase. The result is that exposure to sudden stress does not lead to break-away phenomena between matrix and disperse phase, and there is therefore an advantageous effect on mechanical properties, swelling behavior, and buckling behavior.

Differential Scanning Calorimetry (DSC) is used to determine the glass transition temperature ($T_g$) and the range of the glass transition ($\Delta T_g$) of the microgels. To determine $T_g$ and $\Delta T_g$, two cooling/heating cycles are carried out. $T_g$ and $\Delta T_g$ are determined in the second heating cycle. From 10-12 mg of the selected microgel are used for the determinations, in a DSC specimen container (standard aluminum dish) from Perkin-Elmer. The first DSC cycle is carried out by first cooling the specimen to −100° C. with liquid nitrogen and then heating it at a rate of 20K/min to +150° C. The second DSC cycle is begun by immediately cooling the specimen as soon as its temperature has reached +150° C. The cooling takes place at a rate of about 320 K/min. In the second heating cycle, the specimen is again heated, as in the first cycle, to +150° C. The heating rate in the second cycle is again 20K/min. $T_g$ and $\Delta T_g$ are determined graphically on the DSC curve for the second heating procedure. To this end, three straight lines are drawn in contact with the DSC curve. The $1^{st}$ straight line is drawn in contact with that part of the DSC curve below $T_g$, the $2^{nd}$ straight line is drawn in contact with that part of the curve running through $T_g$ with an inflection point, and the $3^{rd}$ straight line is drawn in that part of the DSC curve above $T_g$. This method gives three straight lines with two intersections. Each of the two intersections is characterized by a characteristic temperature. The glass transition temperature $T_g$ is obtained as the average of these two temperatures, and the range of the glass transition $\Delta T_g$ is obtained from the difference between the two temperatures.

The microgels present in the composition of the invention are in principle known and can be produced in a manner known per se (see, for example. EP-A-0 405 216, EP-A-0 854 171, DE-A 42 20 563, GB-PS 1078400, DE-A-197 01 489, DE-A-197 01 488, DE-A-198 34 804, DE-A-198 34 803, DE-A-198 34 802, EP-A-1 063 259, DE-A-199 39 865, DE-A-199 42 620, DE-A-199 42 614, DE-A-100 21 070, DE-A-100 38 488, DE-A-100 39 749, DE-A-100 52 287, DE-A-100 56 311, and DE-A-100 61 174).

The microgels used in the invention are in particular crosslinked rubber particles based on the following rubbers:

| | |
|---|---|
| BR: | polybutadiene, |
| ABR: | butadiene/acrylic acid-C1-4-alkyl ester copolymers, |
| IR: | polyisoprene, |
| SBR: | random styrene-butadiene copolymers having styrene contents of from >0 to <100 percent by weight, |
| X-SBR: | carboxylated styrene-butadiene copolymers, |
| FKM: | fluoro rubber, |
| ACM: | acrylate rubber, |
| NBR: | polybutadiene-acrylonitrile copolymers having acrylonitrile contents of from 5-60 percent by weight, preferably from 10-50 percent by weight, |
| X-NBR: | carboxylated nitrile rubbers, |
| CR: | polychloroprene, |
| IIR: | isobutylene/isoprene copolymers having isoprene contents of from 0.5-10 percent by weight, |
| HNBR: | partially and fully hydrogenated nitrile rubbers, |
| EPDM: | ethylene-propylene-diene copolymers, |
| EAM: | ethylene/acrylate copolymers, |
| EVM: | ethylene/vinyl acetate copolymers, |
| Q: | silicone rubbers, |
| AU: | polyester urethane polymers, |
| EU: | polyether urethane polymers, |
| ENR: | epoxidized natural rubber, or a mixture thereof. |

The uncrosslinked microgel starting products are advantageously produced by the following methods:
1. crosslinking copolymerization in emulsion (direct polymerization) using monomers of relatively high functionality,
2. crosslinking of uncrosslinked latices, e.g. via treatment with crosslinking agents, e.g. dicumyl peroxide,
3. redispersion of polymers which are not accessible by emulsion polymerization, from the corresponding solutions of these polymers, in organic solvents, and crosslinking, by method 2, of the secondary latices thus obtained,
4. functionalization of the microgels obtained by methods 1 to 3, using suitable methods, or by grafting with suitable monomers.

The microgels (B) are preferably those obtainable by methods 1 and 2. Particular preference is given to those which are produced by crosslinking copolymerization by method 1, in emulsion, where suitable monomers are copolymerized during the crosslinking polymerization process with functionalized, in particular hydroxy-functional, monomers.

When the microgels used in the invention are produced by emulsion polymerization, examples of the monomers used, capable of free-radical polymerization, are the following: butadiene, styrene, acrylonitrile, isoprene, esters of acrylic and methacrylic acid, tetrafluoroethylene, vinylidene fluoride, hexafluoropropene, 2-chlorobutadiene, 2,3-dichlorobutadiene, and also carboxylic acids containing double bonds, e.g. acrylic acid, methacrylic acid, maleic acid, itaconic acid, etc., hydroxy compounds containing double bonds, e.g. hydroxyethyl methacrylate, hydroxyethyl acrylate, hydroxypropyl methacrylate, hydroxypropyl acrylate, hydroxybutyl methacrylate, hydroxybutyl acrylate, amine-functionalized (meth)acrylates, acrolein, N-vinyl-2-pyrrolidone, N-allylurea, and N-allylthiourea, secondary amino (meth)acrylates, such as 2-tert-butylaminoethyl methacrylate, and 2-tert-butylaminoethylmethacrylamide etc.

The rubber gel can be crosslinked directly during the emulsion polymerization process, for example via copolymerization with crosslinking polyfunctional compounds, or can be achieved via subsequent crosslinking, as described below. Direct crosslinking during the emulsion polymerization process is preferred, as mentioned above. Preferred comonomers of relatively high functionality, or polyfunctional comonomers, are compounds having at least two, preferably from 2 to 4, copolymerizable C═C double bonds, e.g. diisopropenylbenzene, divinylbenzene, trivinylbenzene, divinyl ether, divinyl sulfone, diallyl phthalate, triallyl cyanurate, triallyl isocyanurate, 1,2-polybutadiene, N,N'-m-phenylenemaleimide, 2,4-tolylenebis(maleimide), and/or triallyl trimellitate. It is also possible to use the acrylates and methacrylates of polyhydric, preferably di- to tetrahydric C2 to C10 alcohols, such as ethylene glycol, 1,2-propanediol, butanediol, hexanediol, polyethylene glycol having from 2 to 20, preferably from 2 to 8, oxyethylene units, neopentyl glycol, bisphenol A, glycerol, trimethylolpropane, pentaerythritol, sorbitol, with unsaturated polyesters derived from aliphatic di- and polyols, and also maleic acid, fumaric acid, and/or itaconic acid.

Examples include: ethylene glycol di(meth)acrylate, propylene glycol di(meth)acrylate, 1,4-butandiol di(meth)acrylate, 1,6-hexanediol di(meth)acrylate, trimethylolpropane di(meth)acrylate, trimethylolpropane tri(meth)acrylate, etc. The monomers of relatively high functionality can be used alone or in combination. Quantitative proportions of these monomers are, for example, from about 0.01 to 10% by weight, based on the total weight of the microgels.

Examples of direct crosslinking during the polymerization process are described by way of example in: EP-A-1 664 158, EP-A-1 149 866, EP-A-1 149 867, EP-A-1 298 166, EP-A-1 291 369, EP-A-1 245 630.

The crosslinking to give rubber microgels during the emulsion polymerization process can also take place by continuing the polymerization process up to high conversions, or in the monomer feed process, through polymerization using high internal conversions. Another possibility consists in carrying out the emulsion polymerization process in the absence of regulators.

For the crosslinking of the uncrosslinked or of the weakly crosslinked microgel starting products following the emulsion polymerization process, the best method uses the latices which are obtained during the emulsion polymerization process. Natural rubber latices, too, can be crosslinked in this way.

Examples of suitable crosslinking chemicals are organic peroxides, such as dicumyl peroxide, tert-butyl cumyl peroxide, bis(tert-butylperoxyisopropyl)benzene, di-tert-butyl peroxide, 2,5-dimethylhexane 2,5-dihydroperoxide, 2,5-dimethylhex-3-yne 2,5-dihydroperoxide, dibenzoyl peroxide, bis(2,4-dichlorobenzoyl) peroxide, tert-butyl perbenzoate, and also organic azo compounds, such as azobisisobutyronitrile and azobiscyclohexanonitrile, and also di- and polymercapto compounds, such as dimercaptoethane, 1,6-dimercaptohexane, 1,3,5-trimercaptotriazine, and mercapto-terminated polysulfide rubbers, such as mercapto-terminated reaction products of bischloroethylformal with sodium polysulfide.

The ideal temperature for carrying out the post-crosslinking process naturally depends on the reactivity of the crosslinking agent, and can be carried out at temperatures from room temperature to about 180° C., if appropriate under elevated pressure (in which connection see Houben-Weyl, Methoden der organischen Chemie [Methods of organic chemistry], 4$^{th}$ edition, volume 14/2, pages 848). Particularly preferred crosslinking agents are peroxides.

The crosslinking of rubbers containing C=C double bonds to give microgels can also take place in dispersion or emulsion with simultaneous, partial or, if appropriate, complete, hydrdogenation of the C=C double bond, by using hydrazine, as described in U.S. Pat. No. 5,302,696 or U.S. Pat. No. 5,442,009, or, if appropriate, by using other means of hydrogenation, examples being organometal hydride complexes.

If appropriate, particle enlargment can be carried out by agglomeration prior to, during, or after the post-crosslinking process.

The microgels used in the invention have modification by hydroxy groups at locations in particular including the surface of the particles. The hydroxy group content of the microgels is determined in the form of hydroxy number with the dimension mg KOH/g of polymer, by reaction with acetic anhydride and titration of the resultant liberated acetic acid with KOH to DIN 53240. The hydroxyl number of the microgels is preferably from 0.1-100, still more preferably from 1 to 100, mg KOH/g of microgel, and still more preferably from 3 to 70 mg KOH/gram of microgel, and more preferably from 5 to 50 mg KOH/gram of microgel.

A particularly successful method of introducing the hydroxy groups into the microgels used in the invention uses hydroxy compounds containing double bonds, e.g. hydroxyalkyl (meth)acrylates, such as 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, and 4-hydroxybutyl (meth)acrylate, etc.; mono(meth)acrylates of polyoxyalkylene glycol (having from 2 to 23 oxyalkylene units), such as polyethylene glycol, polypropylene glycol, etc.; unsaturated amides containing hydroxy groups, e.g. N-hydroxymethyl(meth)acrylamide, N-(2-hydroxyethyl)(meth)acrylamide, and N,N-bis(2-hydroxyethyl)(meth)acrylamide, etc.; vinylaromatic compounds containing hydroxy groups, e.g. o-hydroxystyrene, m-hydroxystyrene, p-hydroxystyrene, o-hydroxy-alpha-ethylstyrene, m-hydroxy-alpha-methylstyrene, p-hydroxy-alpha-methylstyrene, and p-vinylbenzyl alcohol, etc.; (meth) allyl alcohol compounds, etc.

The expression "(meth)acrylat" in this application always includes the acrylates and methacrylates.

The hydroxy groups can moreover also be obtained via subsequent modification of microgels not containing hydroxy groups.

Microgels preferred in the invention are those based on styrene, on butadiene, and on hydroalkyl (meth)acrylates, e.g. HEMA, which are directly crosslinked with addition of polyfunctional compounds, particular examples being polyacrylates, such as trimethylolpropane triacrylate.

Sulfur-Containing Organosilicon Compounds d)

The sulfur-containing organosilicon compounds d) generally always have one of the following structural elements:

an organosilicon structural element, in particular an alkoxysilyl group, preferably a trialkoxysilyl group, a sulfur-containing structural element, in particular moiety $S_x$ of a sulfide or of a polysufide, in which x can be on average from about 1 to 10, preferably from 1 to 6, a divalent "spacer" group Q, which connects the organosilicon structural element to the sulfur-containing structural element.

Sulfur-containing organosilicon compounds that can be used are in particular those having the following fundamental structures:

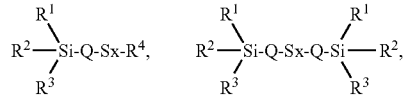

in which x can be on average from 1 to 10, preferably from 1 to 6, $R^1$, $R^2$, and $R^3$ are alkoxy groups preferably having from 1 to 10 carbon atoms, Q is a spacer group, in particular based on aliphatic, heteroaliphatic, aromatic, or heteroaromatic carbon chains having from 1 to 20 carbon atoms, preferably from 1 to 10 carbon atoms, and having 1 to 3 heteroatoms, such as oxygen, sulfur, nitrogen, $R^4$ is hydrogen, alkyl, and/or a moiety with the following structures:

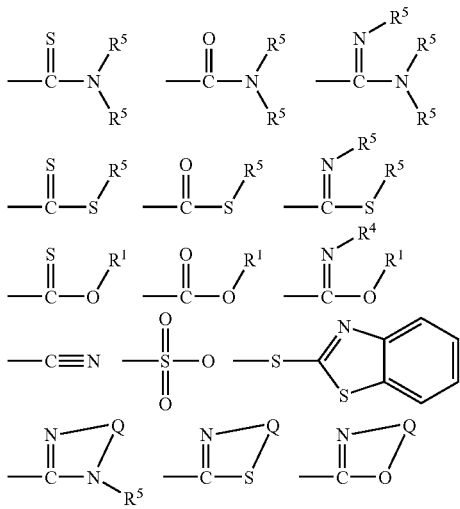

in which $R^5$ is an aliphatic, heteroaliphatic, cycloaliphatic, aromatic, or heteroaromatic moiety having from 1 to 20, preferably from 1 to 10, carbon atoms, and having from 1 to 3 heteroatoms, such as oxygen, nitrogen, or sulfur.

Preferred sulfur-containing organosilicon compounds are bis(triethoxysilylpropyl polysulfanes) of the following structural formula:

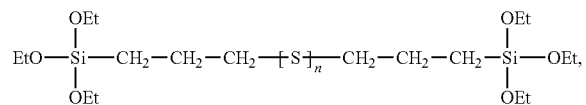

where n=from 2 to 4. Products of this type are commercially available as silane Si 75 (n=2), and as silane Si 69 (n=4) from Degussa.

Advantageous total amounts used of the sulfur-containing organosilicon compounds are from 0.2 phr to 12 phr.

In the invention it is essential that the sulfur-containing organosilicon compounds d) are added in at least two separate portions. Separate means that the addition of the proportions is chronologically separate. The meaning of this in practice is clear to the person skilled in the art, without defining any minimum chronological separation. The chronological separation is at least about 1 minute, and still more preferably at least 20 minutes up to 6 or 8 hours, as a function of the rubber mixture and mixing apparatus. It is preferable that the addition takes place during at least two different mixing stages at elevated temperatures in particular or more than 60° C., between which there is at least one cooling step.

Vulcanizing Agent e)

Vulcanizing agents used in the invention are in particular sulfur or sulfur donors, such as dithiomorpholine (DTDM) or 2-(4-morpholinodithio)benzothiazole (MBSS). Examples of amounts used of sulfur and sulfur donors are from 0.1 to 15 parts by weight, preferably from 0.1-10 parts by weight, based on the total amount of rubber.

Rubber Additives f):

Among the rubber additives used in the invention are in particular the vulcanization accelerators. Examples of suitable vulcanization accelerators are mercaptobenzothiazoles, -sulfenamides, guanidines, thiuram disulfides, dithiocarbamates, thioureas, thiocarbonates, and also dithiophosphates, etc. (Ullmann's Encyclopedia of Industrial Chemistry, VCH Verlagsgesellschaft mbH, D-69451 Weinheim, 1993, vol A 23 "Chemicals and Additives", pp. 366-417).

The vulcanization accelerators are advantageously not added in a mixing step which uses elevated temperatures and which is carried out for the activation of the oxidic filler containing hydroxy groups, for example of the silica and, respectively, of the microgels, by means of the sulfur-containing organosilicon compounds, because they would lead to premature scorch of the mixture. They are therefore preferably incorporated after addition of the sulfur-containing organosilicon compounds, at temperatures which are preferably below 100° C.

The preferred amounts used of the vulcanization accelerators are from 0.1 to 15 parts by weight, preferably from 0.1-10 parts by weight, based on the total amount of rubber.

The rubber mixtures produced in the invention preferably comprise at least one vulcanization accelerator. The mixtures frequently comprise a plurality of accelerators, if appropriate in combination with activators.

The rubber mixtures produced in the invention preferably comprise further rubber additives known per se.

Among these are in particular also further fillers, a particular example being carbon black, the use of which is preferred in the rubber mixtures produced in the invention.

Carbon blacks (E) produced in the invention, see "carbon" or "carbon black" (Ullmann's Encyclopedia of Industrial Chemistry, VCH Verlagsgesellschaft mbH, D-69451 Weinheim, 1993, vol A 5 "Carbon Black", pp. 95-158) are preferably produced by the gas black process, furnace black process, lamp black process, and thermal black process, their new ASTM nomenclature being N 110, N 115, N 121, N 125, N 212, N 220, N 231, N 234, N 242, N 293, N 299, S 315, N 326, N 330, N 332, N 339, N 343, N 347, N 351, N 375, N 472, N 539, N 550, N 582, N 630, N642, N 650, N 660, N 683, N 754, N 762, N 765, N 772, N 774, N 787, N 907, N 908 N 990, N 991 S 3 etc. (ASTM D1765 and D2516). The BET surface areas of the carbon blacks used in the invention are preferably from 5 to 200 $m^2$/g.

Amounts preferably used of carbon black in the invention are from 0 to 120 phr, with preference from 1 to 100 phr, still more preferably from 5 to 80 phr.

The total amount of oxidic filler b) containing hydroxy groups and carbon black in the invention is preferably from 20 to 160 phr, with preference from 25 to 140 phr.

Further fillers which are used if appropriate are:

synthetic silicates, such as aluminum silicate, alkaline earth metal silicate, such as magnesium silicate or calcium silicate, with BET surface areas of from 20-400 $m^2$/g and with primary particle diameters of from 5-400 nm natural silicates, such as kaolin and other naturally occurring silicas, metal oxides, such as zinc oxide, calcium oxide, magnesium oxide, aluminum oxide, metal carbonates, such as calcium carbonate, magnesium carbonate, zinc carbonate, metal sulfates, such as calcium sulfate, barium sulfate, metal hydroxides, such as aluminum hydroxide and magnesium hydroxide, glass fibers and glassfiber products (slats, strands, or glass microbeads), thermoplastics (polyamide, polyester, aramid, polycarbonate, syndiotactic 1,2-polybutadiene and trans-1,4-polybutadiene) and also cellulose and starch, all of which are not within the definition of component b).

Further rubber additives encompass antioxidants, antireversion agents, light stabilizers, antiozonants, processing aids, plasticizers, mineral oil, tackifiers, blowing agents, dyes, pigments, waxes, resins, extenders, organic acids, vulcanization retarders, vulcanization activators, such as zinc oxide, stearic acid, and also zinc stearate, metal oxides, and also further filler activators, such as triethanolamine, trimethylolpropane, polyethylene glycol, hexanetriol, aliphatic trialkoxysilanes, or others known in the rubber industry (Ullmann's Encyclopedia of Industrial Chemistry, VCH Verlagsgesellschaft mbH, D-69451 Weinheim, 1993, vol A 23 "Chemicals and Additives", pp. 366-417).

The amounts used of the rubber additives are conventional and depend inter alia on the intended use. Examples of conventional amounts for individual rubber additives, with the exception of the further fillers, for example in particular carbon black or mineral oil, are from 0.1 to 50 phr.

It is advantageous to produce the mixture in at least two stages, and it is preferable here that, in the first at least two mixing stages, the mixture constituents a)+b)+c), and also 30% to 80%, preferably from 40 to 60%, of the total amount of the sulfur-containing organosilicon compound d) are added to the mixture and thermomechanical treatment is carried out at temperatures which are preferably from 80 to 200° C., more preferably from 120° C. to 190° C., still more preferably from 130° C. to 180° C., for from 1 to 15 min, preferably from 2 to 10 min, where all or part of the total amount of microgel c) is present in the rubber mixture during the first mixing step. In addition to the components mentioned, it is in particular also possible to add further rubber additives in the first mixing step, examples being plasticizers, vulcanization activators, such as zinc oxide, stearic acid, vulcanizing agents, such as sulfur, antioxidants, and also an organic base, such as diphenylphenylguanidine or di-o-tolylguanidine, these preferably not being added in the presence of vulcanizing agent. In order to avoid scorch, it is advantageous that no vulcanization accelerators are added in the first mixing step.

It is advantageous that the rubber mixture obtained in the first mixing stage is cooled to temperatures of <140° C., preferably <100° C., before the remaining amount of sulfur-containing organosilicon compound and the further components are added. It is also possible to store the mixtures at room temperature between the first and second mixing stage.

The second mixing stage preferably comprises addition of the remaining amount of sulfur-containing organosilicon compound to the mixture obtained in the first mixing stage, and thermomechanical treatment at temperatures which are preferably from 80 to 200° C., more preferably from 120° C. to 190° C., still more preferably from 130° C. to 180° C., for from 1 to 15 min, preferably from 2 to 10 min. Further rubber additives can be added in the second mixing stage in addition to the components mentioned, examples being plasticizers, zinc oxide, stearic acid, sulfur, antioxidant, and also an organic base, such as diphenylguanidine or di-o-tolylguanidine, if this has not previously been done in the first mixing step. In order to avoid scorch at the high temperatures, it is again advantageous that no vulcanization accelerators are added in the second mixing step.

It is advantageous that the rubber mixture which is obtained in the second mixing stage is cooled to temperatures<100° C., preferably <80° C., before addition of further components and in particular of the vulcanization accelerator(s). Again, it is possible to store the mixture at room temperature between the second and third mixing stage.

Scorch of the mixture must be avoided during the thermomechanical treatment of the rubber mixture in the first and second mixing step. For this reason, the thermomechanical treatment is carried out without additives which would lead to scorch of the mixture. Addition of vulcanization accelerators and, if appropriate, also of sulfur donors, capped bismercaptans, and also sulfur and, if appropriate, zinc oxide and stearic acid must therefore be carried out at the end of the second mixing step, after cooling of the mixture to temperatures<120° C., preferably <100° C., particularly preferably <80° C.

The accelerators can also be added in a third mixing stage, which is carried out at temperatures<60° C., e.g. on a roll.

Suitable assemblies for producing the mixture are known per se and include by way of example rolls, internal mixers, or else mixing extruders.

The rubber mixtures produced in the invention are preferably vulcanized at temperatures of from 100 to 250° C., preferably 130 to 180° C., if appropriate under a pressure of from 1 to 100 bar.

The rubber mixtures produced in the invention are suitable for the production of various tire components, in particular for tire treads, subtreads, carcasses, sidewalls, reinforced sidewalls for spare tires, apex mixtures, etc., and also for the production of industrial rubber items, such as damping elements, roll coverings, conveyor-belt coverings, drive belts, spinning cops, gaskets, golf-ball cores, shoe soles, etc. The mixtures are particularly suitable for the production of tire treads, subtreads, carcasses, and apex mixtures. Tires or tire parts here also include, for example, treads of summer tires, of winter tires, and of all-season tires, and also treads of car tires and of truck tires.

The following examples illustrate the invention.

EXAMPLES

Rubber Gel

The present invention used an SBR gel with $T_g=-15°$ C. This gel has an insoluble fraction of 94.8% by weight in toluene. The swelling index in toluene is: 7.35. The hydroxy number is 32.8 mg KOH/g of gel.

The gel was produced by copolymerizing a monomer mixture, the constitution of which is listed in the table below, by using the polymerization conditions disclosed in EP 1 298 166 under the heading "[1]Production of Rubber Gel", in paragraph [0077].

| Monomers | Quantitative proportions [parts by weight] |
|---|---|
| Butadiene | 44.5 |
| Styrene | 46.5 |
| Trimethylolpropane trimethacrylate | 1.5 |
| Hydroxyethyl methacrylate | 7.5 |

The gel latex obtained during the polymerization process was further treated and worked up as in EP 1245 630 "Production Example 1: Production of Conjugated Diene-Based Rubber Gel 1" in paragraphs [0103] and [0104].

Variation of Addition Sequence of Microgel and of Sulfur-Containing Organosilicon Compound Experiment 1 is a comparative example, essentially using silica (80 phr) as filler alongside carbon black (5 phr), without microgel. The silica is activated with bis(triethoxysiliylpropyl monosulfane) (Si 75 from Degussa Hüls AG), and the entire amount of silane is added here in the $1^{st}$ mixing stage.

Experiment 2 is a comparative example in which the rubber mixture also comprises microgel (20 phr) and also some carbon black (5 phr), alongside silica (80 phr). Silica and microgel are activated with bis(triethoxysilylpropyl monosulfane) (Si 75 from Degussa Hüls AG), and the entire amount of silane is added here in the 1$^{st}$ mixing stage.

Experiments 6 and 7 are comparative experiments not within the invention, where only 20% of the total amount of sulfur-containing organosilane are added in the first mixing step. 80% of the total amount of the sulfur-containing organosilane (=sulfur-containing organosilicon compound d)) were added in the second mixing step.

Experiments 3, 4 and 5 of this study are examples of the invention, in which 75% (experiments 3 and 4) and 50% (experiment 5) of the total amount of sulfur-containing organosilane were added in the 1st mixing step. The remaining amount of sulfur-containing organosilane was added in the second mixing step in these examples. In the case of experiment 4, addition of the microgel was also delayed to the 2nd mixing step.

| 1st mixing stage | | | | | | | |
|---|---|---|---|---|---|---|---|
| | Compounded material No. | | | | | | |
| | 1 | 2 | 3 | 4 | 5 | 6 | 7 |
| Solution SBR [1] | 110 | 110 | 110 | 110 | 110 | 110 | 110 |
| Polybutadiene [2] | 20 | 20 | 20 | 20 | 20 | 20 | 20 |
| Microgel [3] | — | 20 | 20 | — | 20 | 20 | — |
| Silica [4] | 80 | 80 | 80 | 80 | 80 | 80 | 80 |
| Mineral oil [5] | 7.5 | 7.5 | 7.5 | 7.5 | 7.5 | 7.5 | 7.5 |
| Zinc oxide [6] | 2.5 | 2.5 | 2.5 | 2.5 | 2.5 | 2.5 | 2.5 |
| Stearic acid [7] | 1 | 1 | 1 | 1 | 1 | 1 | 1 |
| TMQ [8] | 1 | 1 | 1 | 1 | 1 | 1 | 1 |
| 6 PPD [9] | 1 | 1 | 1 | 1 | 1 | 1 | 1 |
| Ozone wax [10] | 1.4 | 1.4 | 1.4 | 1.4 | 1.4 | 1.4 | 1.4 |
| Si75 [11] | 6.4 | 6.4 | 4.8 | 4.8 | 3.2 | 1.3 | 1.3 |
| Maximum temperature [° C.] | 150 | 150 | 150 | 150 | 150 | 150 | 150 |
| Time at max. temperature [min.] | 6 | 6 | 6 | 6 | 6 | 6 | 6 |
| Cooling and storage at 23° C. [h] | 24 | 24 | 24 | 24 | 24 | 24 | 24 |

[1] Buna ® VSL 5025-1 HM from Lanxess Deutschland GmbH (extended with 37.5 phr of mineral oil)
[2] Buna ® CB 25 (neodymium polybutadiene) from Lanxess Deutschland GmbH
[3] Microgel
[4] Vulkasil S from Lanxess Deutschland GmbH
[5] Enerthene 1849-1
[6] Rotsiegel zinc white from Grillo Zinkoxid GmbH
[7] Edenor C 18 98-100 from Cognis Deutschland GmbH
[8] 2,2,4-trimethyl-1,2-dihydroquinonline, polymerized (Vulkanox ® HS/LG from Lanxess Deutschland GmbH)
[9] N-1,3-dimethylbutyl-N'-phenyl-p-phenylenediamine (Vulkanox ® 4020/LG from Lanxess Deutschland GmbH)
[10] Antilux ® 654 from RheinChemie GmbH
[11] Bis(triethoxysilylpropylmonosulfane) (Si 75 from Degussa Hüls AG)

| 2nd mixing stage | | | | | | | |
|---|---|---|---|---|---|---|---|
| | Compounded material No. | | | | | | |
| | 1 | 2 | 3 | 4 | 5 | 6 | 7 |
| Mikrogel | — | — | — | 20 | — | — | 20 |
| Si75 | — | — | 1.6 | 1.6 | 3.2 | 5.1 | 5.1 |
| Maximum temperature [° C.] | 150 | 150 | 150 | 150 | 150 | 150 | 150 |
| Time at max. temperature [min.] | 6 | 6 | 6 | 6 | 6 | 6 | 6 |
| Cooling and storage at 23° C. [h] | 24 | 24 | 24 | 24 | 24 | 24 | 24 |

| 3rd mixing stage (roll) | | | | | | | |
|---|---|---|---|---|---|---|---|
| | Compounded material No. | | | | | | |
| | 1 | 2 | 3 | 4 | 5 | 6 | 7 |
| Carbon black [12] | 5 | 5 | 5 | 5 | 5 | 5 | 5 |
| Sulfur [13] | 1.9 | 1.9 | 1.9 | 1.9 | 1.9 | 1.9 | 1.9 |
| CBS [14] | 1.9 | 1.9 | 1.9 | 1.9 | 1.9 | 1.9 | 1.9 |
| DPG [15] | 2.3 | 2.3 | 2.3 | 2.3 | 2.3 | 2.3 | 2.3 |
| Maximum temperature [° C.] | <50 | <50 | <50 | <50 | <50 | <50 | <50 |

[12] Corax N 234 from Degussa Hüls AG
[13] Soluble sulfur (Chancel ® 90/95° ground sulfur from Solvay Barium Strontium)
[14] N-Cyclohexyl-2-benzothiazylsulfenamide (Vulkanox ® CZ/C from Lanxess Deutschland GmbH)
[15] Diphenylguanidine (Vulkacit ® D/C from Lanxess Deutschland GmbH)

Mooney viscosity and Mooney relaxation were determined after 10 and 30 sec on the unvulcanized rubber mixture. Experiments 3 and 5 of the invention are found to have lower Mooney viscosities (ML1+1 and ML1+4, in each case at 100° C.), and also lower Mooney relaxation values after 10 and 30 sec, than Comparative Experiments 1 and 2. This means that the mixtures produced in the invention have better processibility than Comparative Experiments 1 and 2.

| Testing of mixtures | | | | | | | |
|---|---|---|---|---|---|---|---|
| | Compounded material No. | | | | | | |
| | 1 | 2 | 3 | 4 | 5 | 6 | 7 |
| ML 1 + 1 (100° C.) [MU] | 133.9 | 116.3 | 114.6 | 130 | 109.7 | 103.5 | 114.2 |
| ML 1 + 4 (100° C.) [MU] | 98.8 | 99.4 | 97.3 | 110.5 | 92 | 89.5 | 97.2 |
| Mooney relaxation/10 sec. [%] | 31.6 | 30.3 | 29.3 | 33.3 | 28.8 | 27.7 | 29.4 |
| Mooney relaxation/30 sec. [%] | 24.5 | 23.3 | 22.5 | 27.2 | 22.2 | 20.9 | 23.3 |

The vulcanization behavior of the mixtures is studied in a rheometer at 160° C. to DIN 53 529 with the aid of a Monsanto MDR 2000E rheometer. Characteristic data such as $F_a$, $F_{max}$, $F_{max}-F_a$, $t_{10}$, $t_{50}$, $t_{90}$ and $t_{95}$ were thus determined.

The definitions to DIN 53 529, part 3 are:

$F_a$: vulcameter value indicated at minimum of crosslinking isotherm $F_{max}$: maximum vulcameter value indicated $F_{max}-F_a$: difference between maximum and minimum of vulcameter values indicated $t_{10}$: juncture at which 10% of final conversion has been achieved $t_{50}$: juncture at which 50% of final conversion has been achieved $t_{90}$: juncture at which 90% of final conversion has been achieved $t_{95}$: juncture at which 95% of final conversion has been achieved

| Vulcameter testing | | | | | | | |
|---|---|---|---|---|---|---|---|
| | Compounded material No. | | | | | | |
| | 1 | 2 | 3 | 4 | 5 | 6 | 7 |
| $F_a$ [dNm] | 3.59 | 4.72 | 4.66 | 6.11 | 4.31 | 4.26 | 5.33 |
| $F_{max}$ [dNm] | 20.15 | 18.2 | 18.36 | 19.73 | 17.75 | 17.77 | 18.51 |
| $F_{max} - F_a$ [dNm] | 16.56 | 13.48 | 13.70 | 13.62 | 13.44 | 13.51 | 13.18 |
| $t_{10}$ [sec] | 91 | 118 | 122 | 112 | 126 | 125 | 113 |
| $t_{50}$ [sec] | 188 | 211 | 213 | 204 | 217 | 211 | 202 |
| $t_{90}$ [sec] | 685 | 615 | 630 | 665 | 660 | 589 | 578 |
| $t_{95}$ [sec] | 985 | 878 | 896 | 940 | 935 | 883 | 849 |
| $t_{90}-t_{10}$ [sec] | 497 | 404 | 417 | 461 | 443 | 378 | 376 |

In the case of Examples 3, 4, and 5 of the invention, the effects of addition of gel and of silane do not include significant effects on vulcanization curve, vulcanization rate, and degrees of crosslinking.

The test specimens needed for vulcanizate characterization were obtained by press-vulcanization of the mixtures using a hydraulic pressure of 120 bar, at 160° C. The heating times for the various compounded materials are found in the this table:

| Vulcanization time | | | | | | | |
|---|---|---|---|---|---|---|---|
| | Compounded material No. | | | | | | |
| | 1 | 2 | 3 | 4 | 5 | 6 | 7 |
| Temperature [° C.] | 160 | 160 | 160 | 160 | 160 | 160 | 160 |
| Time [min.] | 21 | 21 | 21 | 21 | 21 | 21 | 21 |

The following table collates the vulcanizing properties of Experiments 3, 4, and 5 and of the invention, and of Comparative Experiments 1, 2, 6, and 7, which are not of the invention.

| Vulcanizate properties | | | | | | | |
|---|---|---|---|---|---|---|---|
| | Compounded material No. | | | | | | |
| | 1 | 2 | 3 | 4 | 5 | 6 | 7 |
| Shore A hardness at 23° C. DIN 53505 | 64.9 | 62.4 | 62.3 | 62.7 | 62.1 | 61.1 | 61.3 |
| Shore A hardness at 70° C. DIN 53505 | 58.5 | 58 | 59 | 60 | 59 | 59 | 61 |
| Rebound resilience, 0° C. DIN 53512 [%] [%] | 9 | 9 | 9 | 9 | 9 | 9 | 9 |
| Rebound resilience, 23° C. DIN 53512 [%] [%] | 26 | 23 | 23 | 20 | 23 | 24 | 22 |
| Rebound resilience, 70° C. DIN 53512 [%] [%] | 58 | 61 | 62 | 62 | 63 | 62 | 62 |
| Rebound resilience, 100° C. | 66 | 69 | 69 | 69 | 69 | 70 | 69 |
| Delta R70-R23 | 32 | 38 | 39 | 42 | 40 | 38 | 40 |
| Compression set, 23° C. [%] | 5.6 | 5.01 | 6.01 | 5.23 | 5.68 | 5.59 | 4.53 |
| Compression set, 70° C. [%] | 14.42 | 14.41 | 14.32 | 14.28 | 15.23 | 15.74 | 14.78 |
| $\sigma_{10}$ DIN 53504 [MPa] | 0.6 | 0.5 | 0.6 | 0.6 | 0.5 | 0.5 | 0.5 |
| $\sigma_{25}$ DIN 53504 [MPa] | 1.0 | 0.9 | 0.9 | 1.0 | 0.9 | 0.9 | 0.9 |
| $\sigma_{50}$ DIN 53504 [MPa] | 1.5 | 1.4 | 1.4 | 1.5 | 1.4 | 1.3 | 1.4 |
| $\sigma_{100}$ DIN 53504 [MPa] | 2.6 | 2.7 | 2.8 | 3 | 2.8 | 2.6 | 2.7 |
| $\sigma 300$ DIN 53504 [MPa] | 13.8 | 16.2 | 16.4 | 16.2 | 16.8 | 15.4 | 15.0 |
| Tensile strength, DIN 53504 [MPa] | 21.4 | 20.1 | 20.4 | 20.2 | 20.2 | 20 | 19.9 |
| Elongation at break, DIN 53504 [MPa] | 413 | 355 | 351 | 368 | 344 | 368 | 378 |
| $\sigma_{300} \times \epsilon_b$ | 5699 | 5751 | 6388 | 5962 | 5779 | 5667 | 5670 |
| Abrasion, DIN 53516 [mm3] | 117 | 116 | 115 | 113 | 115 | 121 | 116 |

| Dynamic properties/Eplexor test* (heating rate: 1 K/min) | | | | | | | |
|---|---|---|---|---|---|---|---|
| | Compounded material No. | | | | | | |
| | 1 | 2 | 3 | 4 | 5 | 6 | 7 |
| E' (0° C.)/10 Hz [MPa] | 44.09 | 46.11 | 47.15 | 60.96 | 43.98 | 46.9 | 55.56 |
| E''(0° C.)/10 Hz [MPa] | 15.86 | 21.04 | 21.63 | 31.36 | 20.09 | 20.97 | 29.14 |
| tan δ (0° C.)/10 Hz | 0.36 | 0.456 | 0.459 | 0.515 | 0.457 | 0.447 | 0.525 |

-continued

Dynamic properties/Eplexor test* (heating rate: 1 K/min)

| | Compounded material No. | | | | | | |
|---|---|---|---|---|---|---|---|
| | 1 | 2 | 3 | 4 | 5 | 6 | 7 |
| E' (60° C.)/10 Hz [MPa] | 10.57 | 7.01 | 7.03 | 6.73 | 6.66 | 7.01 | 6.28 |
| E''(60° C.)/10 Hz [MPa] | 1.15 | 0.66 | 0.68 | 0.59 | 0.62 | 0.68 | 0.56 |
| tan δ (60° C.)/10 Hz | 0.109 | 0.095 | 0.096 | 0.088 | 0.093 | 0.098 | 0.09 |
| tan δ (0° C.) − tan δ (60° C.) | 0.251 | 0.361 | 0.363 | 0.427 | 0.364 | 0.349 | 0.435 |

*Eplexor 500 N (Gabo-Testanlagen GmbH, Ahlden, Germany)

When the vulcanizates 3, 4, and 5 produced in the invention are compared with the comparative products 1 and 2, their products $\sigma_{300} \times \epsilon_b$ are found to be larger or at least equally large, without any sacrifices in terms of the differences between the rebound resilience values Δ(R70–R23), and this means that the vulcanizates produced in the invention have improved mechanical properties, without any sacrifices in terms of wet slip resistance/rolling resistance relationship.

The improvements in wet slip resistance/rolling resistance relationship are confirmed by dynamic measurements (Eplexor test). In the case of vulcanizates 3, 4, and 5, the differences found for tan δ (0° C.)–tan δ (60° C.) are greater than in the case of Comparative Experiments 1 and 2.

The sequential silanization of the invention gives the vulcanizates an improved product of modulus at 300% elongation and elongation at break ($\sigma_{300} \times \epsilon_b$), without any sacrifices in terms of the difference in the rebound resilience values $\Delta(R_{70}-R_{23})$.

The present invention has been described with reference to specific details of particular embodiments thereof. It is not intended that such details be regarded as limitations upon the scope of the invention except insofar as and to the extent that they are included in the accompanying claims.

As used in this specification and the appended claims, the singular forms "a," "an," and "the" include plural referents unless the content clearly dictates otherwise.

What is claimed is:

1. A process for the production of a rubber mixture, comprising the steps of:
    admixing the following components:
        one or more rubber components,
        one or more oxidic fillers containing hydroxy groups,
        one or more microgels containing hydroxy groups, and
        one or more sulfur-containing organosilicon compounds,
    wherein the sulfur-containing organosilicon compounds are admixed in at least a first portion and a separate second portion, wherein the first portion comprises at least 30% by weight of the total amount of the sulfur-containing organosilicon compounds.

2. The process according to claim 1, wherein said admixing is performed in at least a first mixing stage, whereby a first mixture is formed, and a second mixing stage, whereby a second mixture is formed.

3. The process according to claim 2, wherein the addition of the organosilicon compounds is performed in the first mixing stage and the second mixing stage.

4. The process according to claim 1, wherein said admixing comprises at least a first mixing stage and a second mixing stage wherein the first mixing stage comprises admixing:
    the one or more rubber components,
    the one or more oxidic fillers containing hydroxy groups,
    the one or more microgels containing hydroxy groups,
    the one or more sulfur-containing organosilicon compounds,
    at temperatures of more than 60° C., and
    wherein at least 30% by weight of the total amount of the sulfur-containing organosilicon compounds are added, thereby forming a first mixture, and subsequent to said first mixing stage, performing a second mixing stage, wherein at least one further portion of the total amount of the sulfur-containing organosilicon compounds are added to the first mixture and mixed at temperatures of more than 60° C., thereby forming a second mixture.

5. The process according to claim 4, wherein during said second mixing stage, the entire remaining amount of the sulfur-containing organosilicon compounds are added.

6. The process according to claim 1, wherein said one or more microgels containing hydroxy groups are added in at least two separate portions.

7. The process according to claim 2, wherein the addition of the one or more microgels containing hydroxy groups is performed in the first mixing stage and the second mixing stage.

8. The process according to claim 7, wherein during the second mixing stage, the entire remaining amount of the one or more microgels containing hydroxy groups are added.

9. The process according to claim 2, wherein the first mixing stage and the second mixing stage are preformed at temperatures of more than 60° C.

10. The process according to claim 2, wherein the first and second mixtures are cooled between the first and second mixing stages.

11. The process according to claim 2, wherein during the first mixing stage from 30 to 80% by weight of the sulfur-containing organosilicon compound, based on the total amount of the sulfur-containing organosilicon compound used, are added.

12. The process according to claim 4, further comprising:
    cooling the second mixture, and
    subsequent to the second mixing stage, performing a third mixing stage, wherein one or more rubber additives, one or more vulcanization accelerators, and one or more vulcanizing agents, are admixed with the second mixture at temperatures less than 60° C., thereby forming a third mixture.

13. The process according to claim 12, in which a first part of the one or more microgels containing hydroxy groups is added in the first mixing stage and a second part thereof is added in third mixing stage.

14. The process according to claim 1,
wherein the one or more sulfur-containing organosilicon compounds comprise at least two different sulfur-containing organosilicon compounds.

15. A process for the production of a vulcanizate, comprising:
vulcanizing the rubber mixtures obtained according to the process as claimed in claim 1.

16. The process according to claim 1, wherein said components further comprise
one or more vulcanizing agents, and
one or more rubber additives.

17. The process according to claim 2, wherein the first mixing stage and the second mixing stage are preformed at temperatures of more than 100° C.

* * * * *